United States Patent [19]

Liu et al.

[11] 4,266,200

[45] May 5, 1981

[54] METAL HALIDE LASER TUBE STRUCTURE

[76] Inventors: Chi-sheng Liu, 1315 Knollwood Dr., Monroeville, Pa. 15146; Lelland A. C. Weaver, 2403 Collins Rd., Pittsburgh, Pa. 15235; Roy K. Williams, R.D. #3 Box 103, Export, Pa. 15632

[21] Appl. No.: 758,977

[22] Filed: Jan. 13, 1977

[51] Int. Cl.³ .............................................. H01S 3/03
[52] U.S. Cl. ......................... 331/94.5 G; 331/94.5 D
[58] Field of Search .................... 331/94.5 G, 94.5 D, 331/94.5 PE; 313/204, 220

[56] References Cited

U.S. PATENT DOCUMENTS

| | | | |
|---|---|---|---|
| 3,934,211 | 1/1976 | Sucoy et al. | 331/94.5 G |
| 3,988,633 | 10/1976 | Shurgan | 313/204 |

*Primary Examiner*—William L. Sikes

[57] ABSTRACT

A plurality of spaced-apart apertured discs constructed of electrical insulator material, are sealed within the quartz tube structure of a metal halide laser tube to increase the path length along the wall of the laser tube between the discharged electrodes to constrain the discharge to the central gaseous core rather than along the wall of the quartz tube. The use of electrical insulator apertured discs sealed with the laser tube of a metal halide laser facilitates the utilization of the halide species as the laser medium.

3 Claims, 2 Drawing Figures

METAL HALIDE LASER TUBE STRUCTURE

This invention resulted from work performed under U.S. Navy Contract N00014-74-C-0445.

BACKGROUND OF THE INVENTION

The concept of employing spaced-apart apertured discs constructed of electrical insulator material within the quartz tube structure of a metal halide laser is illustrated in U.S. Pat. No. 3,934,221, entitled "Metal Halide Vapor Laser," issued Jan. 20, 1976, assigned to the assignee of the present invention and incorporated herein by reference. While the concept is illustrated in the above-identified U.S. patent, the concept is not patentable subject matter as to the issued patent.

The use of metal halide to provide substantially reduced operating temperatures in metal vapor lasers has been established with copper halides, lead halides and manganese halides. This concept is disclosed in detail in the above-referenced U.S. patent. With double-pulsed operation in copper halide, for instance, the laser output occurs during the second current pulse with a predetermined pulse separation establishing the maximum operating conditions. Typically, the first pulse dissociates the metal halide to provide sufficient metal atoms in the ground state for electrical excitation into the upper laser levels. Operating the laser at finite repetition rates, each electric current pulse not only excites the existing metal vapor but also continues to dissociate additional metal halide molecules so that the subsequent pulse at a predetermined delay will result in laser emission.

The electrical dissociation of metal halide is a much faster process than is recombination, which proceeds at basically thermal rates. Thus at high repetition rates the metal will precipitate on the walls of the laser tube structure if the period between consecutive pulses is shorter than the recombination time under equilibrium conditions. Metal deposited onto the wall of the laser tube structure not only depletes the lasing material but also leads to a pronounced reduction in the laser tube operating life. A metallic film on the wall functions as a short circuit to the electrical discharge, thereby causing the electrical discharge to move along the wall and eventually overheat and melt the laser tube structure.

While the prior art, such as that represented by U.S. Pat. Nos. 3,522,551 and 3,516,012, discloses the use of metallic apertured discs in laser tube structures, the prior art fails to disclose the operational advantages realized through the use of apertured insulator discs sealed within the quartz tube structure of a metal halide laser.

U.S. Pat. No. 3,522,551 discloses the use of apertured graphite confinement rings positioned within but intermittently spaced from the walls of a laser tube structure. The confinement rings of U.S. Pat. No. 3,522,551 are spaced from the walls for thermal radiation purposes. The apertured graphite confinement rings serve to constrict the plasma to a path corresponding to the aligned apertures of the graphite discs.

The argon laser disclosure of U.S. Pat. No. 3,516,012 employs a quartz tube within which are positioned spaced-apart aperture discs which cooperate with a magnetic field producing means to collimate the laser discharge. Insulators are employed between adjacent apertured discs.

SUMMARY OF THE INVENTION

The operating problems peculiar to the metal halide laser described above are overcome through the use of apertured insulator discs, i.e., quartz discs, sealed within the quartz tube structure of the metal halide laser such that the apertures are aligned along the optical axis and the discs are sealed to the walls of the quartz tube to completely eliminate passage of the metal halide vapor between the discs and the wall of the quartz tube.

The unique operating conditions, and the corresponding potential adverse operational effects, encountered in a metal halide laser which are overcome through the use of sealed apertured insulator discs within the quartz tube structure cannot be overcome employing the electrically conductive disc structures of the prior art.

DESCRIPTION OF THE DRAWING

The invention will become more readily apparent from the following exemplary description in connection with the accompanying drawings.

DESCRIPTION OF THE PREFERRED EMBODIMENT

Figure 1:
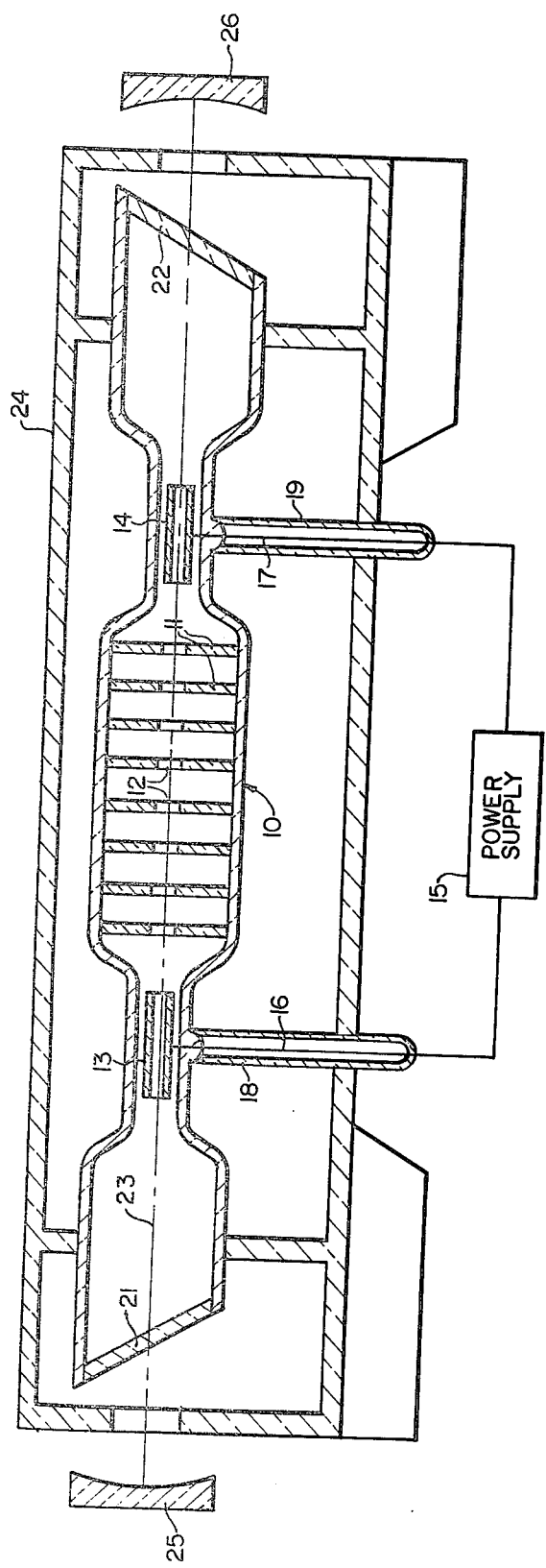
FIG. 1 is a sectional elevation of a longitudinal discharge tube of a metal halide laser employing apertured insulator discs; and, FIG. 2 is an alternate embodiment to FIG. 1 wherein the discs are an integral part of the quartz laser tube.

While the following discussion will be directed to a copper halide laser, it is apparent that the advantages realized from the electrical insulator apertured discs is equally applicable to all metal halide vapor lasers.

During the normal course of operation at elevated temperatures both in copper halide and dissociated copper species condense on the inner surfaces of the laser discharge tube. Since these materials are highly or at least partially conducting of electrical current, the discharge tends to "track" or affix itself to the laser tube walls, thereby overheating the walls and causing catastrophic failure of the laser tube. With the use of electrical insulator apertured discs the total path length between electrodes along the inner walls is significantly increased, such that the discharge no longer finds the inner tube surface the highest conductivity path between the electrodes. Accordingly, the laser discharge occupies the central axial portion of the laser tube volume defined by the disc apertures and avoids the tube walls. Thus the normal dissociation, diffusion, condensation and evaporation processes which occur within the laser tube do not interfere with the electrical discharge processes, despite the fact that the laser medium and its dissociation products are electrically conducting.

A further advantage of this configuration is that completely sealed-off operation is possible with the normal vapor equilibrium processes operating properly. That is, without such vapor equilibrium the laser medium would condense irreversibly on the cold sections of the laser tube, or would require a continuous flow of gases to remove deleterious dissociation products. However, the electrical insulator apertured disc structure permits the normal vaporization and condensation processes to occur in equilibrium within the laser region without interference with discharge excitation processes, thereby allowing long laser tube lifetimes due to the chemical reversibility of these processes. This permits the laser tube to be completely sealed off in operation, leading to a simplified practical design characterized by long operating lifetimes.

The disc structure also provides more desirable discharge properties by confining the discharge to the longitudinal axis, thereby maintaining coincidence between the optical gain path (i.e., the mirror optical axis) and the discharge excitation region. This confinement maintains high current densities for effective excitation of the laser population inversion, and prevents the discharge from becoming unstable. If unconstrained, these metal halide discharges tend to constrict and form themselves into a "corkscrew" configuration or helical instability which prevents effective laser excitation.

Since the halides are electron-attaching, these instability problems tend to be aggravated by the additional electron loss process. Thus the electrical insulator apertured disc structure contributes to the maintenance of stable, diffuse high current density discharges within the central portion of the laser discharge tube.

Referring to FIG. 1, there is illustrated a metal halide vapor laser structure 2 including a laser discharge tube 10 which is preferably made of quartz. For the purpose of illustration the tube 10 is filled with CuI powder. Laser discharge tube 10 includes a plurality of closely spaced annular discs 11 constructed of an electrical insulator material, also preferably quartz, which are sealed, or fused, to the inner surface of the wall of the laser discharge tube 10. Discs 11 have apertures 12 which are aligned along the optical axis 23 of the laser discharge tube 10 which corresponds to the longitudinal axis of the laser tube 10. The sealed apertured discs 11 provides an effective path length, as indicated by the arrows, which is substantially longer that that of the conventional metal halide discharge tube. The increased path length afforded by the electrical insulator apertured discs 11 between the discharge electrodes 13 and 14 constrains the discharge to the central gaseous core corresponding to the apertures 12 rather than along the walls of the laser discharge tube 10. Electrodes 13 and 14 are connected to a power source 15 by leads 16 and 17 respectively.

Laser discharge tube 10 also includes a pair of Brewster angle windows 21 and 22. Also positioned along the optical axis is a pair of mirrors 25 and 26 for resonating the stimulated emission to provide optical feedback, for increasing intensity, beam directivity and coherence. Mirror 25 is preferably 100% reflective at the desired laser wavelength whereas mirror 26 is about 90% reflective at that wavelength.

Figure 2:
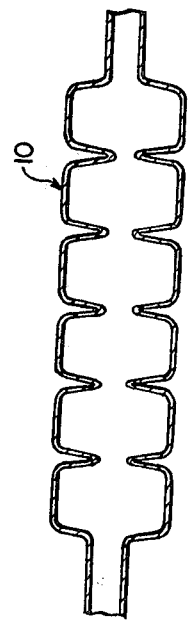

Referring to FIG. 2, there is illustrated an alternate technique for developing the desired laser discharge tube configuration incorporating the electrical insulator apertured discs. Instead of sealing discrete discs to the inner wall of the laser discharge tube 10 as illustrated in FIG. 1, the "discs" of FIG. 2 are formed as an integral part of the laser discharge tube by heating the quartz discharge tube and forming the "discs" mechanically. The approach illustrated in FIG. 2 eliminates potential leak problems encountered in the configuration of FIG. 1 resulting from sealing of the disc 11 to the inner wall of the laser tube 10.

We claim:

1. In a metal halide laser apparatus including a laser discharge tube containing a metal halide laser medium, electrodes spaced apart to define a laser discharge gap therebetween, optical elements disposed at either end of said laser discharge tube to define an optical axis coinciding substantially with the longitudinal axis of said laser discharge tube, electrical excitation means connected to said electrodes for providing laser excitation,
   the improvement for increasing the operational life of said laser discharge tube, the improvement comprising,
   a plurality of electrical insulator apertured discs positioned in spaced-apart alignment within said laser discharge tube and sealed to the inner wall of said laser discharge tube, the apertures of said electrical insulator apertured discs being aligned about said optical axis.

2. In a metal halide laser apparatus including a laser discharge tube containing a metal halide laser medium, electrodes spaced apart to define a laser discharge gap therebetween, optical elements disposed at either end of said laser discharge tube to define an optical axis coinciding substantially with the longitudinal axis of said laser discharge tube, electrical excitation means connected to said electrodes for providing laser excitation,
   the improvement for increasing the operational life of said laser discharge tube, the improvement comprising,
   an elongated cylindrical laser discharge tube constructed of an electrical insulator material and including as an integral part thereof a plurality of spaced-apart constricted wall sections having an inner diameter less than the inner diameter of the remaining wall sections of said laser discharge tube, said constricted wall sections forming apertures aligned about the longitudinal axis of said elongated cylindrical laser discharge tube, said longitudinal axis corresponding to the optical axis of said laser apparatus.

3. In a metal halide apparatus as claimed in claim 2 wherein said electrical insulator material is quartz.

* * * * *